US012683340B2

(12) United States Patent
Huang

(10) Patent No.: US 12,683,340 B2
(45) Date of Patent: Jul. 14, 2026

(54) COAXIAL CABLE CONNECTOR

(71) Applicant: EZCONN CORPORATION, New Taipei City (TW)

(72) Inventor: Chi Bin Huang, New Taipei City (TW)

(73) Assignee: EZCONN CORPORATION, New Taipei City (TW)

( * ) Notice: Subject to any disclaimer, the term of this patent is extended or adjusted under 35 U.S.C. 154(b) by 407 days.

(21) Appl. No.: 18/178,296

(22) Filed: Mar. 3, 2023

(65) Prior Publication Data

US 2023/0283023 A1 Sep. 7, 2023

Related U.S. Application Data

(60) Provisional application No. 63/316,446, filed on Mar. 4, 2022.

(51) Int. Cl.
*H01R 24/38* (2011.01)

(52) U.S. Cl.
CPC .................................... *H01R 24/38* (2013.01)

(58) Field of Classification Search
CPC .. H01R 9/0518; H01R 9/0521; H01R 9/0527; H01R 24/38; H01R 24/40; H01R 24/564; H01R 24/566
See application file for complete search history.

(56) References Cited

U.S. PATENT DOCUMENTS

| | | | | |
|---|---|---|---|---|
| 7,507,117 B2 * | 3/2009 | Amidon | H01R 24/40 | 439/584 |
| 7,938,680 B1 * | 5/2011 | Hsieh | H01R 13/187 | 439/578 |
| 2014/0315430 A1 * | 10/2014 | Holland | H01R 13/622 | 439/585 |

* cited by examiner

*Primary Examiner* — Ross N Gushi
(74) *Attorney, Agent, or Firm* — Rankin, Hill & Clark LLP

(57) ABSTRACT

Coaxial cable connectors that are suitable for being engaged with an external thread surface of an electronic device, are disclosed. In a particular embodiment, the connector includes a torque sleeve, including a first end and an internal thread formed on the first end. The connector also includes a post, coaxially arranged in the torque sleeve, including a head portion and a body portion, characterized in that the coaxial cable connector is connected to the electronic device, the head portion is used to electrically connect to the external thread surface of the electronic device, when the torque sleeve gradually moves from a first position to a second position relative to the external thread surface of the electronic device, one end of the external thread of the electronic device abuts the head portion of the post, allowing the post to move axially.

21 Claims, 24 Drawing Sheets

COAXIAL CABLE CONNECTOR

CROSS-REFERENCE TO RELATED APPLICATIONS

This application is a non-provisional application for patent entitled to the filing date and claiming the benefit of earlier-filed U.S. Provisional Patent Application No. 63/316,446, filed Mar. 4, 2022, which is incorporated herein by reference in its entirety.

TECHNICAL FIELD

The present invention relates to a connector for coupling cable to the terminal. More particularly, the invention relates to a coaxial cable connector, wherein the coaxial cable connector is installed easily without special compression tools and has good electrical continuity.

BACKGROUND

In addition to being used in cable television signal reception, coaxial cable connectors are also commonly used in the field of broadband communications. As shown in FIG. 1, the conventional coaxial cable connector 9 includes a post 91, an outer sleeve 92, a nut 93, and a compression sleeve 94. A front end 921 of the outer sleeve 92 is in contact with the outer peripheral surface of the post 91, and a rear end 922 of the outer sleeve 92 cooperates with the post 91 to define a space 923 for a coaxial cable 8 to partially penetrate. The nut 93 is rotatably fixed on the post 91 and the outer sleeve 92. The rear end 922 of the outer sleeve 92 is compressed toward the post 91 by a professional compression tool (not shown in the figure) to prevent the coaxial cable 8 from detaching.

When the conventional coaxial cable connector 9 is combined with an external port 71 of an electronic device 7, an internal thread 931 of the nut 93 is connected to an external thread surface 711 of the external port 71. By tightening the nut 93, the center conductor 81 of the coaxial cable 8 is electrically connected and coupled with the center channel 712 of the external port 71, thereby realizing the electrical and mechanical connection between the electronic device 7 and the coaxial cable connector 9.

The conventional coaxial cable connector 9 often suffers from poor electrical ground contact in use. The reason is that the nut 93 will loosen over time so that the nut 93 fails to fully contact the post 91. For example, the nut 93 may not be properly tightened initially due to an improper number of rotations, or there may be a gap caused by pulling. In addition, the conventional coaxial cable connector 9 may not be properly fastened to the external port 71 of the electronic device 7 due to tolerances, which may cause intermittent problems of poor electrical continuity, which leads to other external signals have the opportunity to enter through the coaxial cable connector 9. Therefore, a related improvement method is to add an elastic conductive element 95 between the nut 93, the post 91 and the external port 71 of the electronic device 7, so that such elements can be in close contact with each other. However, even if various elastic conductive elements 95 with different structures are added, the nut 93 and the external port 71 of the electronic device 7 must be screwed together to a certain extent before electrical conduction, that is, the conventional coaxial cable connector 9 is initially incapable of electrical conduction. When other external signals pass through, unnecessary electrical interference may affect the quality of signal transmission.

Furthermore, the conventional coaxial cable connectors 9 must use the special professional compression tools, which is not convenient, intuitive, and efficient for ordinary users to use, and the users must purchase the special professional compression tools at an additional cost.

Accordingly, a coaxial cable connector is provided.

SUMMARY

The purpose of the present invention is to provide a coaxial cable connector that can solve at least one of the disadvantages of the conventional coaxial cable connector.

The purpose of the present invention is to provide a coaxial cable connector that can be installed easily without special compression tools and has good electrical continuity.

The present invention provides a coaxial cable connector that is suitable for engaging with an external thread surface of an electronic device. The coaxial cable connector comprises a torque sleeve and a post. The torque sleeve includes a first end and an internal thread formed on the first end. The post is coaxially arranged in the torque sleeve, and the post includes a head portion and a body portion, wherein the coaxial cable connector is connected to the electronic device, the head portion is used to electrically connect to the external thread surface of the electronic device. When the torque sleeve gradually moves from a first position to a second position relative to the external thread surface of the electronic device, one end of the external thread of the electronic device abuts the head portion of the post, allowing the post to move axially relative to the torque sleeve.

In some embodiments, the head portion of the post is detachably connected to the body portion.

In some embodiments, the body portion of the post has a small diameter shaft portion, a large diameter shaft portion, and a connecting portion connecting the small diameter shaft portion and the large diameter shaft portion, wherein the connecting portion and the large diameter shaft portion cooperate to define an accommodating space, and the head portion of the post is arranged in the accommodating space.

In some embodiments, the end of the large diameter shaft portion of the post opposite to the connecting portion has a protrusion, and the protrusion is used to prevent the head portion of the post from moving away from the connecting portion, wherein the protrusion, the large diameter shaft portion and the connecting portion cooperate to define the accommodating space.

In some embodiments, the head portion of the post has a surrounding wall, and a plurality of slots formed in the surrounding wall.

In some embodiments, the head portion of the post has a surrounding wall, and a slot formed in the surrounding wall, the slot communicates opposite side edges of the surrounding wall, so that the head portion of the post is in the shape of a C.

In some embodiments, the head portion of the post further has a plurality of hollows extending axially, the hollows are formed in the surrounding wall and are closed without communicating with either side of the surrounding wall.

In some embodiments, the surrounding wall of the post has opposite side edges, and an arcuated portion connecting the side edges, in a free state, the minimum inner diameter of the arcuated portion is smaller than the outer diameter of the thread portion of the electronic device.

In some embodiments, the coaxial cable connector further comprises an end sleeve, the torque sleeve further includes a second end connected to the first end, the end sleeve is sleeved on the second end of the torque sleeve, the end sleeve includes a stop portion extending toward the first end of the torque sleeve, when the torque sleeve is in the second position, the body portion of the post abuts against the stop portion of the end sleeve.

In some embodiments, the coaxial cable connector further comprises an end sleeve, the torque sleeve further includes a second end opposite to the first end, the body portion of the post further has a rear segment connected to the small diameter shaft portion, the end sleeve is coaxially arranged inside the second end of the torque sleeve, when the torque sleeve is in the first position, the rear segment of the post and the end sleeve cooperate to define a first distance in the radial direction, and when the torque sleeve is in the second position, the rear segment of the post and the end sleeve cooperate to define a second distance in the radial direction, and the second distance is smaller than the first distance.

In some embodiments, the inner surface of the end sleeve has an inner groove, the inner surface of the end sleeve is stepped, the end sleeve includes a first annular surface and a second annular surface, the inner diameter of the first annular surface is larger than the inner diameter of the second annular surface, and the inner groove is formed on the second annular surface.

In some embodiments, the torque sleeve further includes an opening, and an annular recess between the opening and the internal thread, the annular recess is used for accommodating a first sealing element.

In some embodiments, the large diameter shaft portion of the post has a first plane, the connecting portion has a second plane, and the first plane cooperates with the second plane to define a notch for accommodating the second sealing element, the opposite sides of the second sealing element are in pressing contact with the second plane of the post and the torque sleeve respectively.

In some embodiments, the head portion of the post is an electrical conductor, when the coaxial cable connector is not completely installed on the external thread surface of the electronic device, the head portion of the post and the external thread surface of the electronic device are in contact and electrically connected.

In some embodiments, the torque sleeve further includes an annular torsion portion formed on the outer peripheral surface, which enables the user to rotate the torque sleeve rotating relative to the external thread surface by applying force.

In some embodiments, the coaxial cable connector further comprises an end sleeve, the torque sleeve further includes a second end connected to the first end, the end sleeve is sleeved on the second end of the torque sleeve, the end sleeve includes a fixed portion and a compression portion oppositely arranged, and the head portion of the post defines an elastic collet, when the torque sleeve is in the first position, the elastic collet of the post is in a relaxed state, when the torque sleeve is in the second position, the elastic collet of the post is compressed and deformed by the compression portion of the end sleeve, thereby the head portion of the post in close contact with the external thread surface of the electronic device.

In some embodiments, the head portion of the post has a rear end opposite to the elastic collet, the body portion is tightly sleeved on the rear end of the head portion, and the post further includes an annular element tightly sleeved inside the head portion, and a rubber ring sleeved between the annular element and the head portion.

In some embodiments, the head portion of the post further has an outer groove formed on the outer peripheral surface of the rear end, the coaxial cable connector further comprises a sealing element located in the outer groove, and opposite sides of the sealing element are in pressing contact with the head of the post and the end sleeve.

The present invention also provides a coaxial cable connector. The coaxial cable connector is suitable for engaging with an external thread surface of an electronic device. The coaxial cable connector comprises a torque sleeve, and a post. The torque sleeve includes a first end and a second end oppositely arranged, and an internal thread formed on the first end. The post is coaxially arranged in the torque sleeve and includes a head portion and a rear segment oppositely arranged, wherein the coaxial cable connector is connected to the electronic device, the head portion surrounds and connects directly to the external thread surface of the electronic device, wherein the torque sleeve is movable between a first position and a second position relative to the external thread surface of the electronic device, when the torque sleeve is in the first position, the rear segment of the post is not surrounded by the second end of the torque sleeve, when the torque sleeve is in the second position, the rear segment of the post is surrounded by the second end of the torque sleeve.

In some embodiments, the coaxial cable connector further comprises an end sleeve sleeved on the second end of the torque sleeve, wherein the torque sleeve is in the first position, the end sleeve defines a surrounding space for a coaxial cable to pass through, the torque sleeve is in the second position, the rear segment of the post penetrates into the surrounding space and reduces the surrounding space.

In some embodiments, the post further includes an annular element and a body portion, the body portion has the rear segment and a front segment opposite to the rear segment, the annular element is tightly fit and sleeved on the front segment of the body portion, and the annular element is slidably arranged on the head portion.

In some embodiments, the annular element and the body portion are integrally formed and slidably disposed on the head portion.

In some embodiments, the head portion of the post has a front end, a tail end and at least one first guiding portion formed at the tail end, and the annular element of the post has at least one second guiding portion that matches the first guiding portion in shape, the at least one second guiding portion of the annular element and the at least one first guiding portion of the head portion are slidably arranged.

In some embodiments, the head portion of the post has a front end, a tail end and at least one elastic bending portion formed at the tail end.

In some embodiments, the head portion of the post is formed by joining together a sheet-like substrate.

In some embodiments, the head portion of the post has a hollow base, and a plurality of elastic pieces connected to the outer periphery of the hollow base, each elastic piece has a front end, a tail end and at least one elastic bending portion formed on the tail end.

In some embodiments, the torque sleeve is made of plastic or elastic material and has flexibility, the inner thread of the torque sleeve fits the external thread surface of the electronic device.

In some embodiments, the first end of the torque sleeve with the internal thread is made from elastic material or plastic material.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
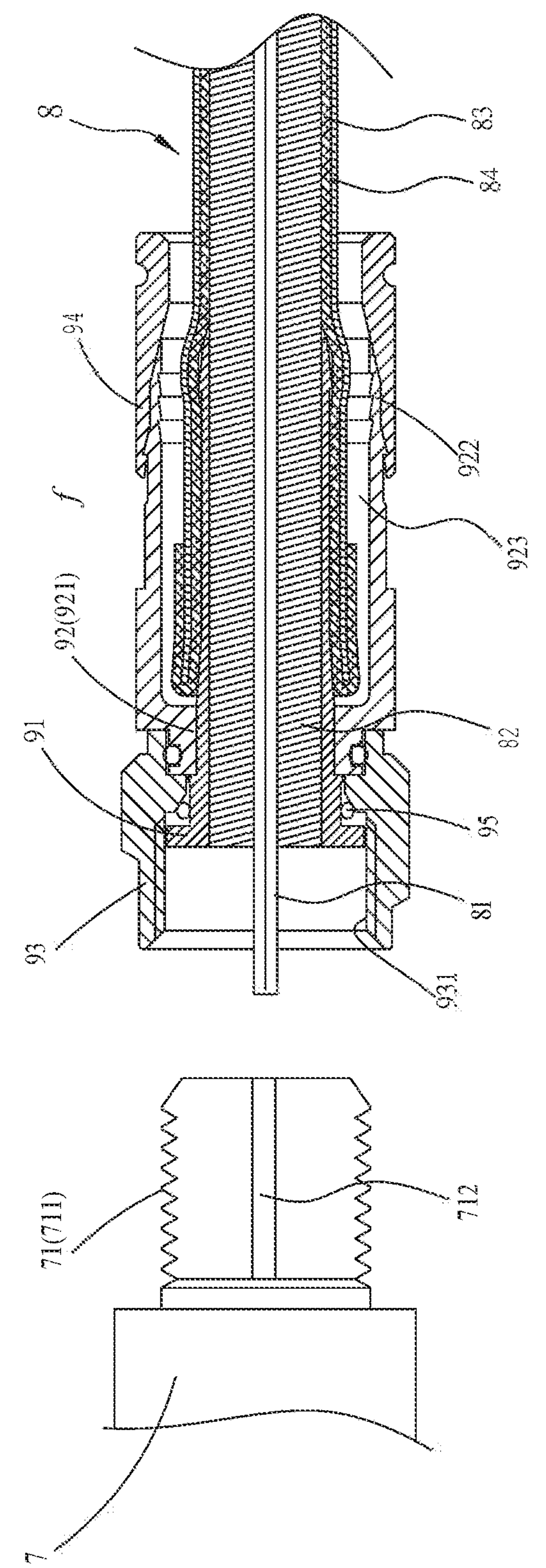
FIG. 1 depicts a cross-sectional perspective view of a traditional coaxial cable connector for coupling a cable.

As shown in FIG. 1, the coaxial cable 8 includes a center conductor 81, an insulating layer 82, a shielding layer (not shown), a braided layer 83, and a plastic jacket 84 sequentially from the inside to the outside. The material of the center conductor 81 is selected from copper, iron, silver, nickel, gold, copper-gold alloy, copper-tin alloy, copper-nickel alloy or other polymer, non-metallic conductors with good conductivity and so on. The braided layer 83 is selected from a metal layer containing aluminum, a metal layer containing copper and a conductive layer containing conductive materials, such as an aluminum foil coating layer or a copper foil coating layer. The braided layer 83 is electrical shielded so that the interference effect can be decreased. The form of the braid layer 83 includes different covering forms such as two-layer weaving (Standard), three-layer weaving (Tri-shield) and four-layer weaving (Quad).

Figure 2:
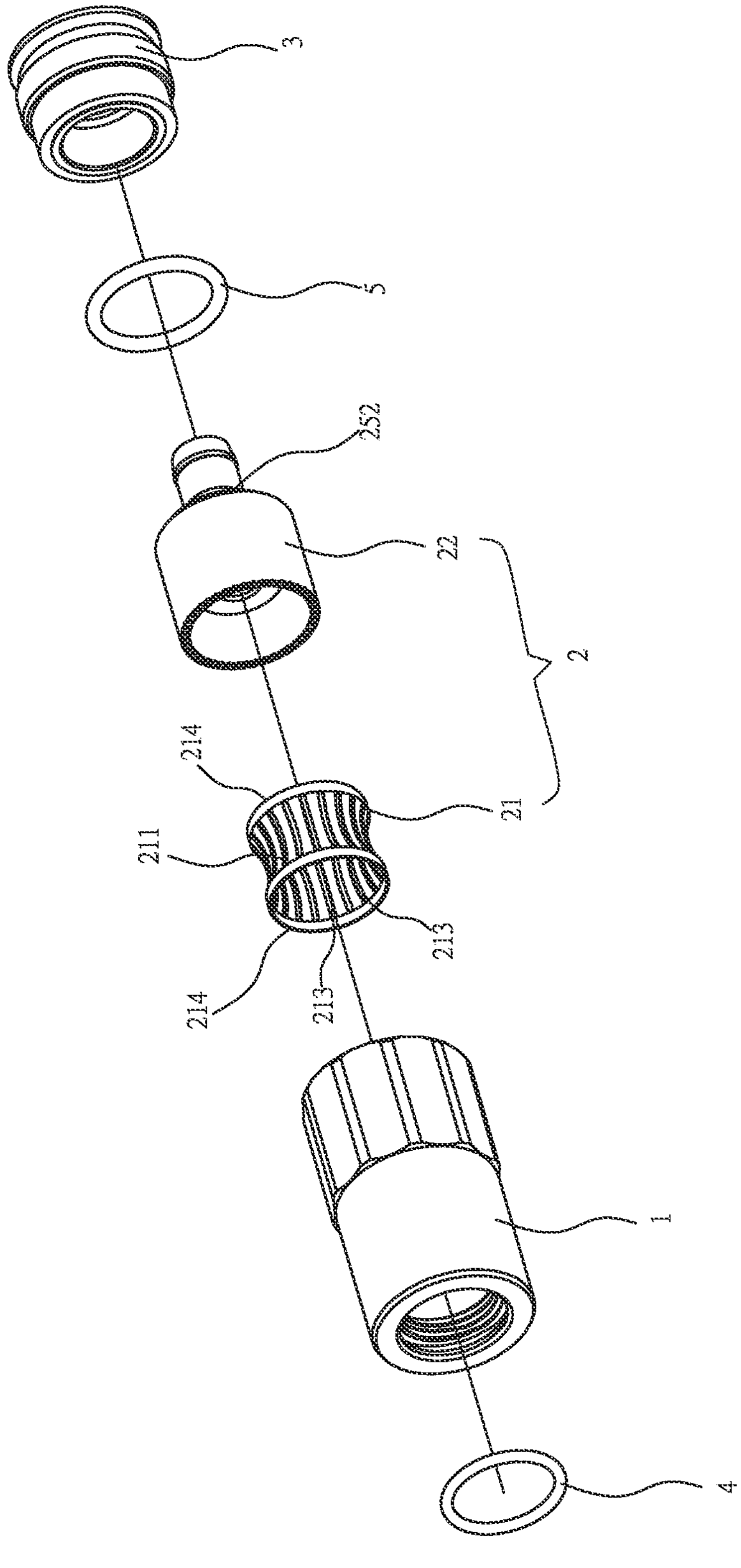
FIG. 2 depicts an exploded perspective view of a coaxial cable connector according to a first embodiment of the present invention.
Figure 3:
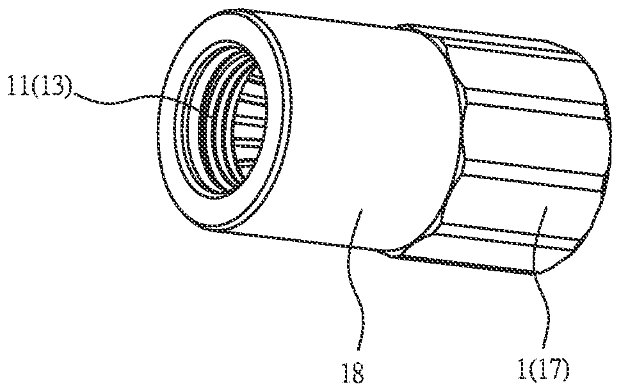
FIG. 3 depicts a perspective view of the first embodiment of the coaxial cable connector according to FIG. 2.
Figure 4:
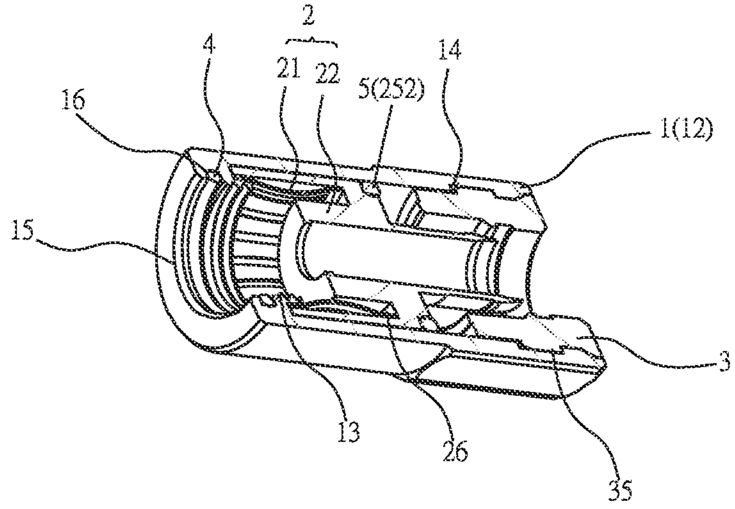
FIG. 4 depicts a partially sectioned perspective view of the first embodiment of the coaxial cable connector according to FIG. 3.
Figure 5:
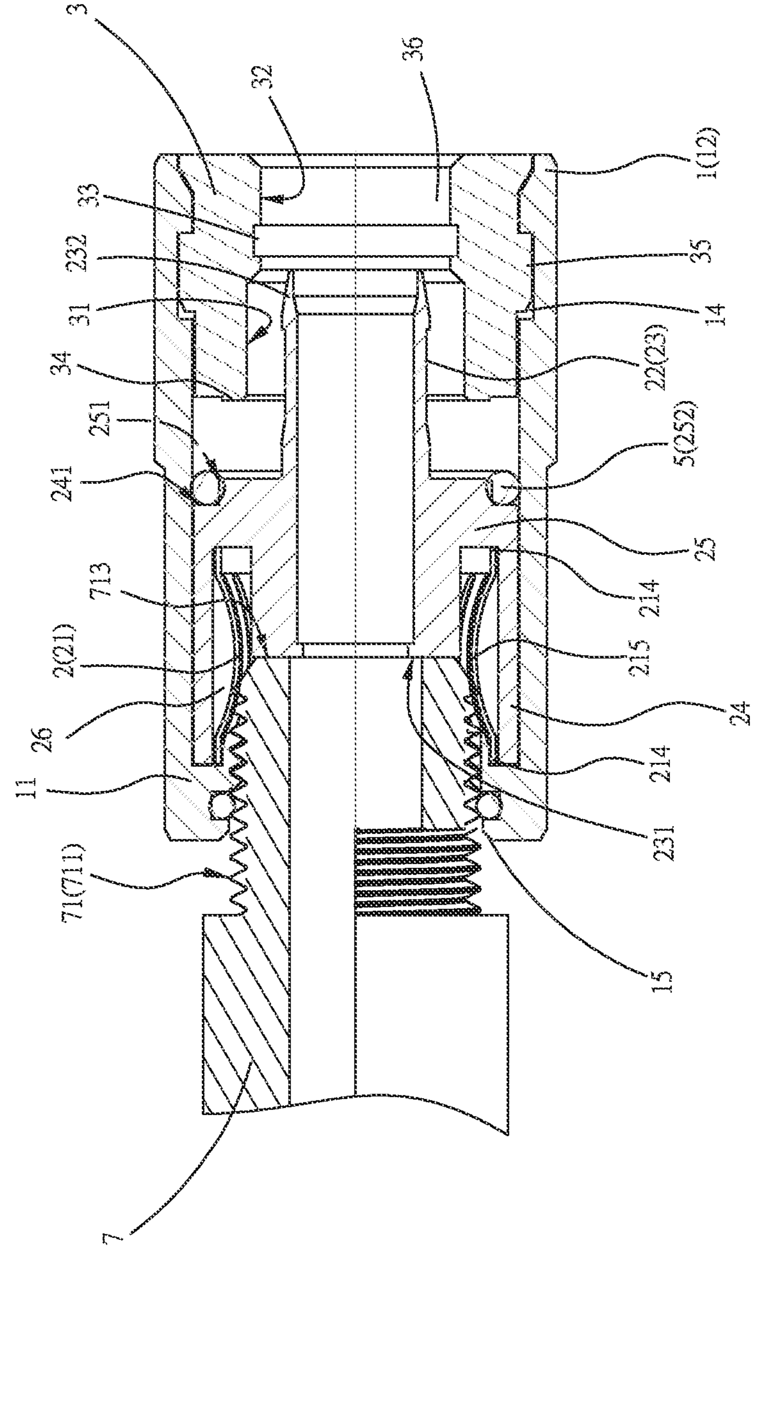
FIG. 5 depicts a cross-sectional perspective view of the first embodiment of the coaxial cable connector, as shown in a partially attached position relative to an external interface port.

FIG. 2 shows an exploded perspective view of a coaxial cable connector according to an exemplary embodiment of the present invention. FIG. 3 shows a perspective view of the coaxial cable connector according to FIG. 2. FIG. 4 shows a partially sectioned perspective view of the coaxial cable connector according to FIG. 3. FIG. 5 shows a cross-sectional perspective view of the coaxial cable connector, as shown in a partially attached position relative to an external interface port. Referring to FIGS. 2 to 5, the present invention provides a coaxial cable connector that is suitable for mounting on an external port 71 of an electronic device 7 (as shown in FIG. 5). The external port 71 includes an axially extending external thread surface 711 and a radially extending end surface 713. The coaxial cable connector includes a torque sleeve 1, a post 2, an end sleeve 3, a first sealing element 4, and a second sealing element 5. The torque sleeve 1, the post 2 and the end sleeve 3 accommodate the coaxial cable coaxially. The material of the post 2 can be one of metal materials such as copper, iron, silver, nickel, gold, copper-gold alloy, copper-tin alloy, copper-nickel alloy, or a combination of polymers with good conductivity, non-metallic conductors, etc. The material of the torque sleeve 1 and end sleeve 3 can be non-metal (such as plastic) or metal as required.

The torque sleeve 1 includes a first end 11, a second end 12, an internal thread 13, a second engagement portion 14, an opening 15, and an annular recess 16. The internal thread 13 is formed on the first end 11. The second engagement portion 14 is formed on the inner surface of the second end 12. The annular recess 16 is located between the opening 15 and the internal thread 13 and is used for accommodating the first sealing element 4. Preferably, the torque sleeve 1 further includes an annular torsion portion 17 forming on the outer peripheral surface thereof, and an exposed surface 18 spaced apart from the annular torsion portion 17. The annular torsion portion 17 is for the user to hold and facilitate to apply force to rotate the torsion sleeve 1 itself. In the radial direction, the outer diameter of the annular torsion portion 17 of the torsion sleeve 1 is larger than the outer diameter of the exposed surface 18, and the appearance of the annular torsion portion 17 can be any shape, such as hexagonal, square, or annular. In this embodiment, the length of the torque sleeve 1 in the axial direction is longer than the overall length of the post 2.

The post 2 is coaxially sleeved in the torque sleeve 1. The post 2 includes a head portion 21 and a body portion 22. In this embodiment, the head portion 21 and the body portion 22 are two-piece components and are detachably connected to each other. In another embodiment, an annular element (not shown) could also be provided between the head portion 21 and the body portion 22. The head portion 21 of the post 2 is an electrical conductor and is used for direct contact with the external thread surface 711 of the electronic device 7. The head portion 21 of the post 2 has a surrounding wall 211 and a plurality of hollows 213. The surrounding wall 211 of the post 2 has two side edges 214 and an arcuated portion 215 connecting the side edges 214. In the free state, the minimum inner diameter of the arcuated portion 215 is smaller than the outer diameter of the thread portion of the external port 71 of the electronic device 7. In this embodiment, the hollows 213 are formed on the surrounding wall 211 and extend in the axial direction, and each hollow 213 is closed in the surrounding wall 211. In some embodiments, the head portion of the post may have a slot connected to opposite side edges of the surrounding wall, so that the head portion of the post is C-shaped as viewed from the front side.

The body portion 22 of the post 2 has a small diameter shaft portion 23, a large diameter shaft portion 24, and a connecting portion 25. Both ends of the connecting portion 25 are respectively connected to the small diameter shaft portion 23 and the large diameter shaft portion 24. In this embodiment, the connecting portion 25 and the large diameter shaft portion 24 are arranged at an angle, and the connecting portion 25 cooperates with the large diameter shaft portion 24 to define an accommodating space 26. The head portion 21 of the post 2 is disposed in the accommodating space 26. In addition, the small diameter shaft portion 23 of the post 2 has an abutting surface 231 facing the opening 15 of the torque sleeve 1, and the abutting surface 231 is used for abutting against the end surface 713 of the external port 71 of the electronic device 7. The large diameter shaft portion 24 of the post 2 has a first plane 241, and the connecting portion 25 has a second plane 251. The first plane 241 cooperates with the second plane 251 to form a notch 252, and the notch 252 is used for accommodating the second sealing element 5. The opposite sides of the second sealing element 5 are in pressing contact with the second plane 251 of the torque sleeve 1 and the post 2 respectively.

Figure 7:
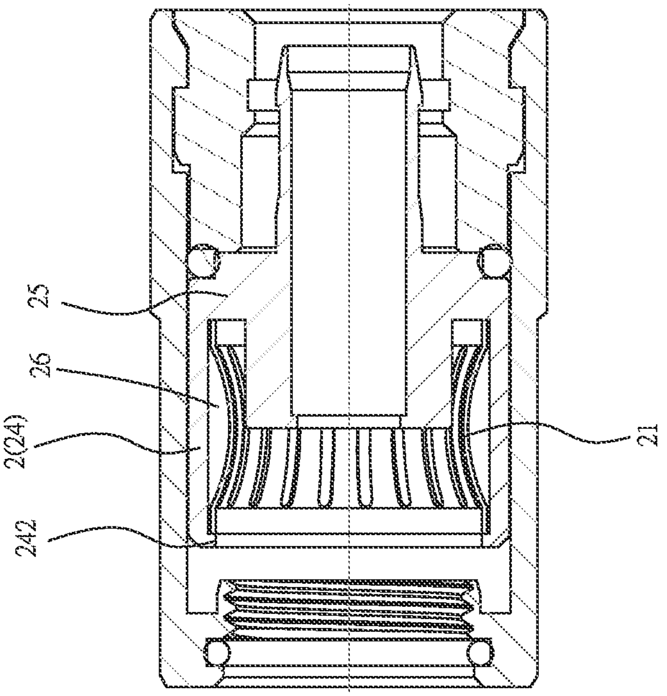
FIG. 7 depicts a cross-sectional perspective view of a post of the coaxial cable connector according to various embodiments of the present invention.

FIG. 7 shows a cross-sectional perspective view of a post of the coaxial cable connector according to various embodiments of the present invention. Referring to FIG. 7, in some embodiments, the large diameter shaft portion 24 of the post 2 has a protrusion 242 at the end opposite to the connecting portion 25. The protrusion 242, the large diameter shaft portion 24 and the connecting portion 25 cooperate to define the accommodating space 26. The protrusion 242 is used to prevent the head portion 21 of the post 2 from moving out of the accommodating space 26.

Referring to FIG. 2, FIG. 3, and FIG. 5, the end sleeve 3 is sleeved on the second end 12 of the torque sleeve 1, and the inner surface of the end sleeve 3 is stepped. The end sleeve 3 includes a first annular surface 31, a second annular surface 32, an inner groove 33, a stop portion 34, and a first engagement portion 35. In this embodiment, the inner diameter of the first annular surface 31 is larger than the inner diameter of the second annular surface 32, and the inner groove 33 is formed on the inner surface of the end sleeve 3 and located on the second annular surface 32. The stop portion 34 extends toward the first end 11 of the torque sleeve 1. The first engagement portion 35 is formed on the outer surface of the end sleeve 3, and the first engagement portion 35 is fitted into the second engagement portion 14 of the torque sleeve 1, thereby preventing the end sleeve 3 from moving axially in the torque sleeve 1. The shapes of the first engagement portion 35 of the end sleeve 3 and the second engagement portion 14 of the torque sleeve 1 are respectively a convex portion and a concave portion with matching shapes. In some embodiments, the first engagement portion 35 of the end sleeve 3 is a concave portion, and the second engagement portion 14 of the torque sleeve 1 is a convex portion.

Referring to FIGS. 2 to 4, to assemble the coaxial cable connector of the present invention, for example, the head portion 21 of the post 2 could be placed in the accommodating space 26 first and the second sealing element 5 is arranged in the notch 252 of the body portion 22. Afterward, the post 2 could be installed from the second end 12 to the first end 11 of the torque sleeve 1. The first engagement portion 35 of the end sleeve 3 is then plugged into the second end 12 of the second engagement portion 14. The assembly is completed by the first sealing element 4 in the annular recess 16 of the second engagement portion 14.

Figure 6:
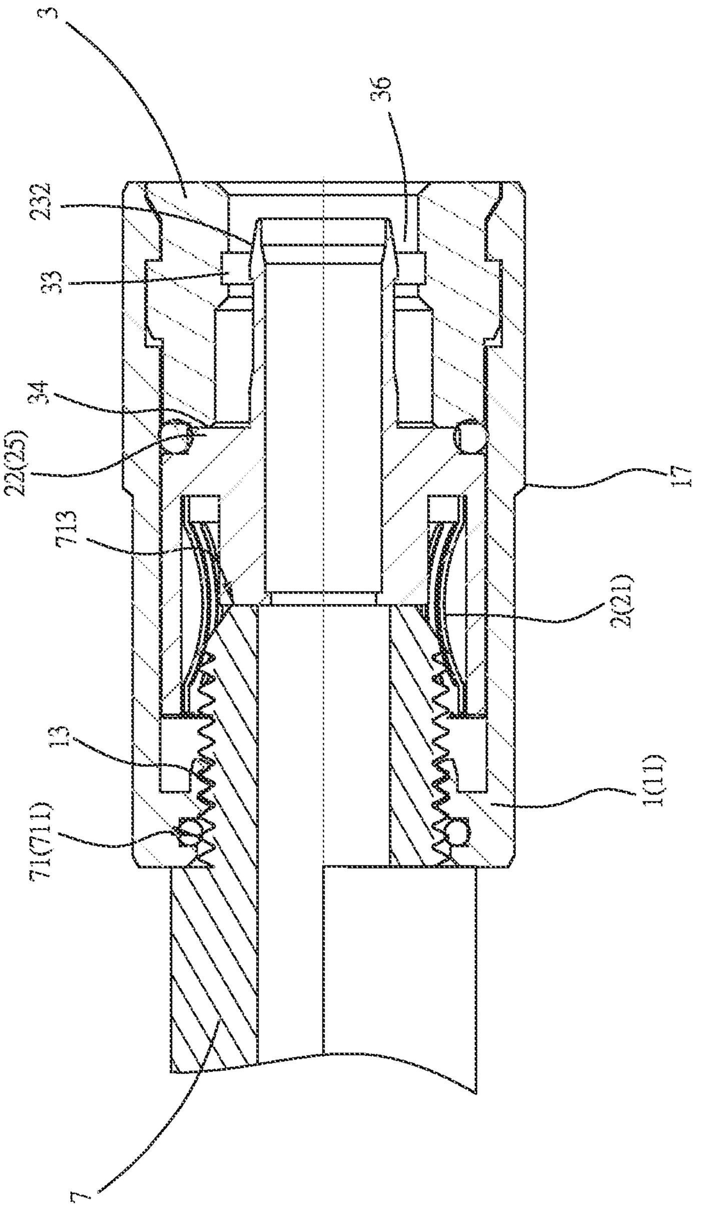
FIG. 6 depicts a cross-sectional perspective view of the first embodiment of the coaxial cable connector, as shown in a fully engaged position relative to the external interface port.

FIG. 5 shows a cross-sectional perspective view of the coaxial cable connector of the present invention, as shown in a partially attached position relative to an external interface port. FIG. 6 shows a cross-sectional perspective view of the coaxial cable connector of the present invention, as shown in a fully engaged position relative to the external interface port. Referring to FIGS. 5 to 6, when the post 2 is subjected to an external force in the axial direction, the torque sleeve 1 is movable relative to the post 2 between a partially attached position (as shown in FIG. 5) and a fully engaged position (as shown in FIG. 6). In the partially attached position, the end sleeve 3 disposed at the second end 12 of the torque sleeve 1 defines a surrounding space 36 for the coaxial cable to pass through. A rear segment 232 of the small diameter shaft portion 23 of the post 2 and the inner groove 33 of the end sleeve 3 do not surround each other, and there is a first distance in the radial direction between the rear segment 232 of the post 2 and the end sleeve 3. In the fully engaged position, the body portion 22 of the post 2 abuts against the stop portion 34 of the end sleeve 3, the rear segment 232 of the post 2 and the inner groove 33 of the end sleeve 3 surround each other, and there is a second distance in the radial direction between the rear segment 232 of post 2 and the end sleeve 3, and the second distance is smaller than the first distance.

Referring to FIGS. 5 to 6, the advantages of the present invention are described below through the steps of installing the coaxial cable connector on the external port 71 of the electronic device 7:

It should be noted that the coaxial cable is omitted in FIGS. 5 and 6, and the related structure of the coaxial cable can be viewed in FIG. 1. First, install the coaxial cable in the coaxial cable connector of the present invention, wherein the center conductor of the coaxial cable to pass through the body portion 22 and the head portion 21 of the post 2 to the center channel in the external port 71. The body portion 22 of the post 2 accommodates the coaxial cable's center conductor, insulating layer and shielding layer. The body portion 22 of the post 2 and the torque sleeve 1 together surround a space that accommodates the braided layer and the plastic jacket of the coaxial cable.

Next, the coaxial cable connector of the present invention is initially connected to the external port 71 of the electronic device 7. When the body portion 22 of the post 2 abuts against the end surface 713 of the external port 71, the head portion 21 of the post 2 is in direct contact with the external thread surface 711 of the external port 71. Even though the coaxial cable connector of the present invention is partially installed on the external surface 711 of the electronic device 7, the head portion 21 of the post 2 and the external thread surface 711 of the electronic device 7 have already been touched, so the conduction effect of electrical connection can be established at the beginning of the process. When the user rotates the torque sleeve 1 to gradually move the internal thread 13 relatives to the external thread surface 711 of the threaded portion of the electronic device 7 from the partially attached position to the fully engaged position, the post 2 gradually moves away from the first end 11 of the torque sleeve 1. The post 2 is pushed by one end of the threaded portion of the external port 71 until it abuts against the stop portion 34 of the end sleeve 3, and the rear segment 232 of the post 2 gradually penetrates the surrounding space 36 defined by the end sleeve 3, thereby reducing the surrounding space 36 to compress the coaxial cable without using special professional compression tools, thereby preventing the coaxial cable from separating from the coaxial cable connector of the present invention. It should be noted that the inner surface of the torque sleeve 1 not only has the internal thread 13, but also has an annular torsion portion 17 on the outer peripheral surface thereof. The annular torsion portion 17 provides a large area of contact with the user's finger. The torque sleeve 1 is rotated by the user by applying force to the annular torsion portion 17. By rotating the torque sleeve 1 relative to the external thread surface 711 of the external port 71, the end surface 713 of the external thread abuts the head portion 21 of the post 2, thereby allowing the post 2 to move axially relative to the torque sleeve 1.

The present invention can continuously provide a conductive effect from the start of installation to the end of the installation. The head portion 21 of the post 2 has been substantially mounted to the external port 71. Once the torque sleeve 1 has gradually moved to the fully engaged position, the rear segment 232 of the post 2 and the end sleeve 3 are matched to clamp the coaxial cable. The inner groove 33 of the end sleeve 3 is used to accommodate the part of the coaxial cable being squeezed and deformed so that the coaxial cable can strengthen the tensile strength between the end sleeve 3 and the post 2.

The advantages of the coaxial cable connector of the present invention can be summarized as follows:

(1) The coaxial cable connector of the present invention and the electronic device maintain electrical continuity through the head portion of the post in electrically contact with the external thread surface of the external port, during any process of initial installation or complete installation. It provides appropriate shielding to prevent noise and other forms of telecommunication interference, ensuring signal transmission quality.

(2) Unlike traditional coaxial cable connectors, the coaxial cable connector of the present invention does not require a professional compression tool. By rotating the torque sleeve and moving relative to the post, the surrounding space for accommodating the coaxial cable can be reduced, effectively preventing the coaxial cable from detaching.

(3) The torque sleeve has a greater axial length than the post's overall length, and the annular torsion portion offers the user with a larger contact area to perform rotations more conveniently.

(4) Components of the coaxial cable connector of the present invention are compact and simple in structure and can reduce costs effectively.

Figure 8:
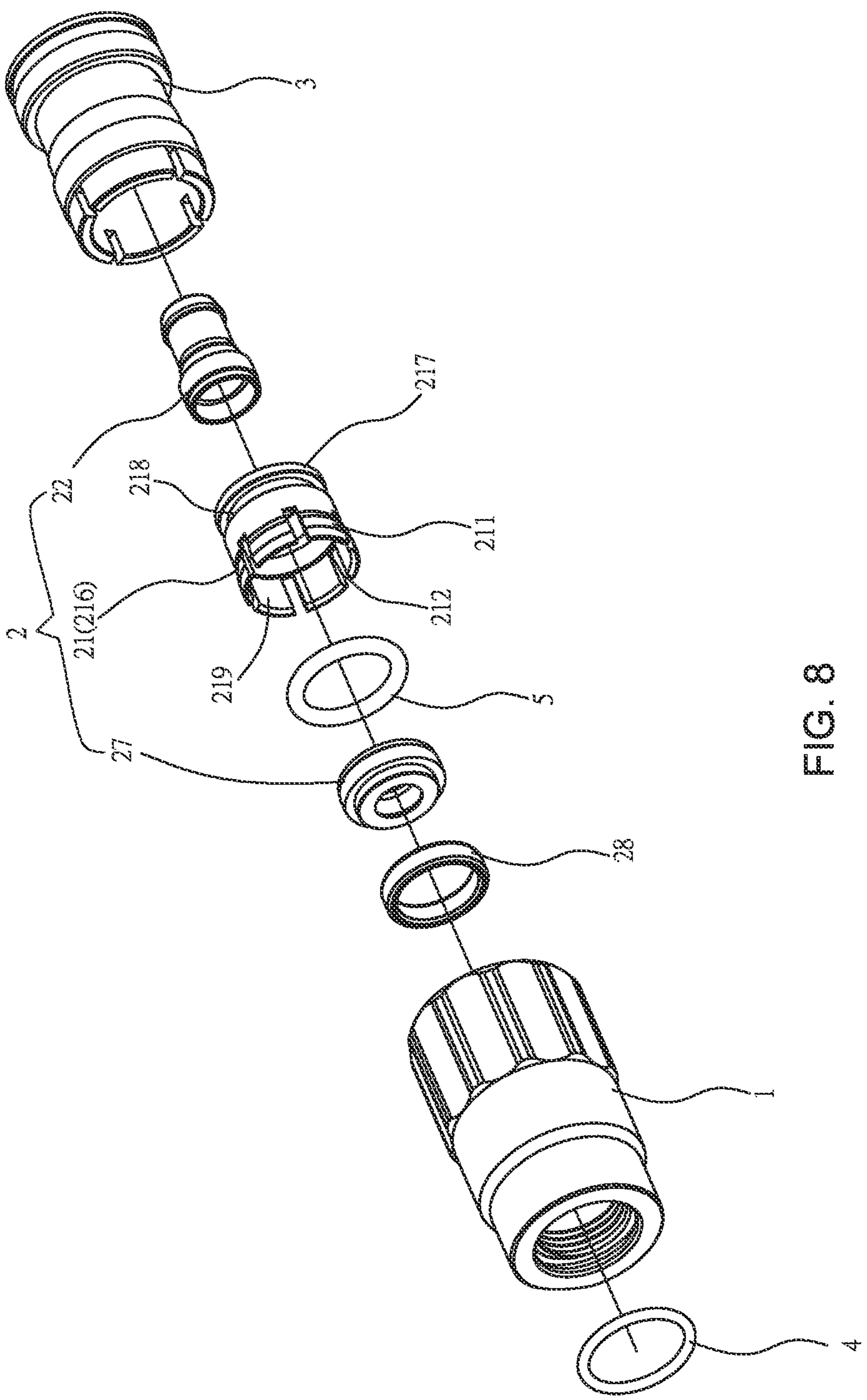
FIG. 8 depicts an exploded perspective view of a coaxial cable connector according to a second embodiment of the present invention.
Figure 9:
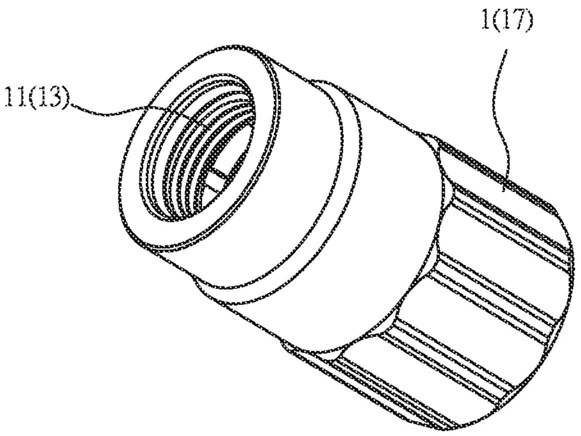
FIG. 9 depicts a perspective view of the second embodiment of the coaxial cable connector according to FIG. 8.
Figure 10:
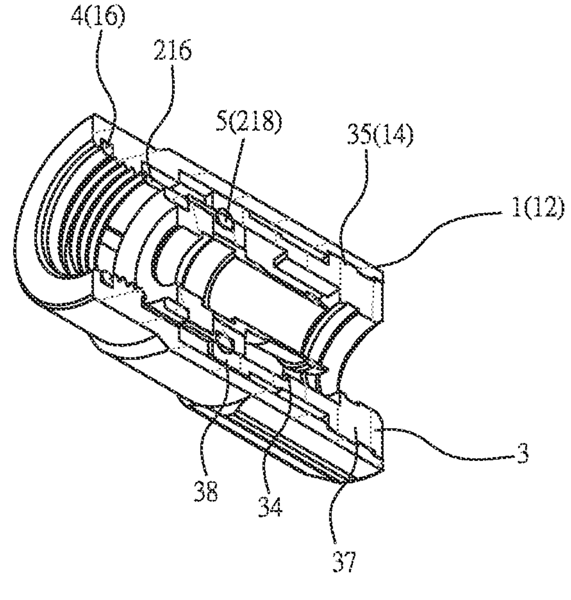
FIG. 10 depicts a partially sectioned perspective view of the second embodiment of the coaxial cable connector according to FIG. 9.
Figure 11:
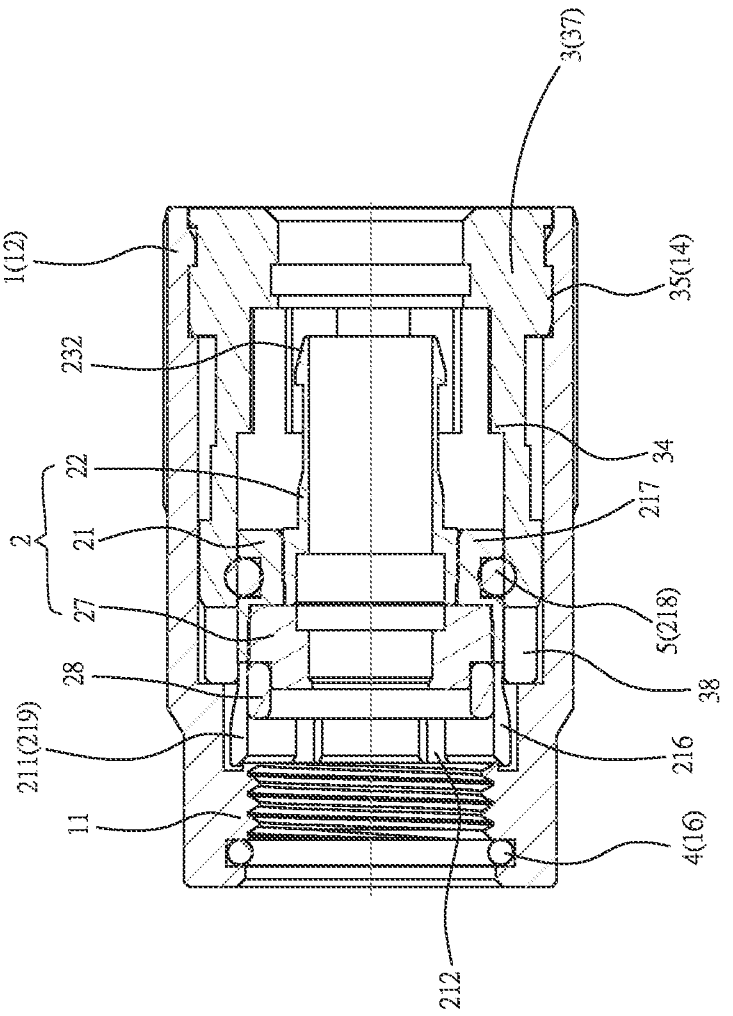
FIG. 11 depicts a cross-sectional perspective view of the second embodiment of the coaxial cable connector, illustrating a torque sleeve is selectively deposited in a partially attached position relative to a post.
Figure 12:
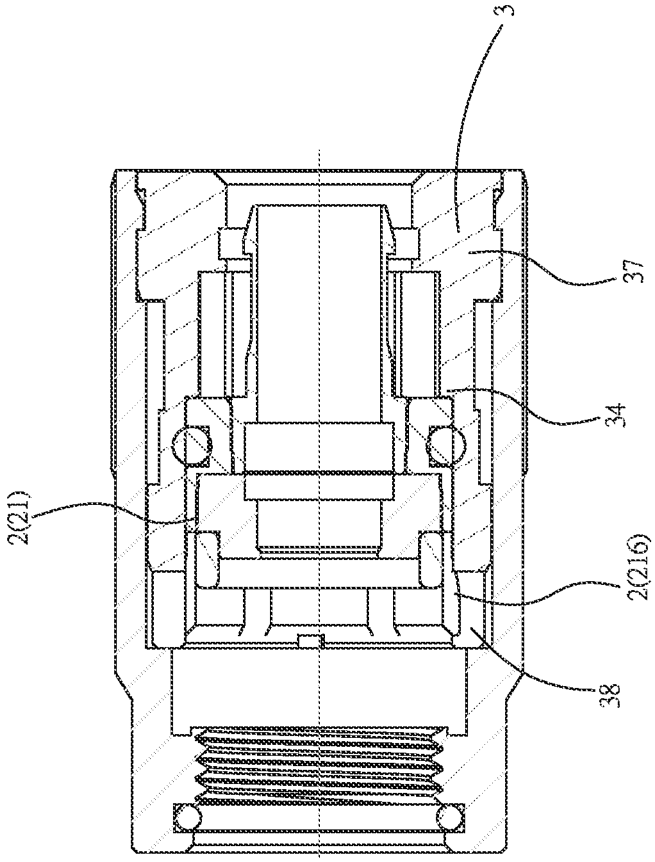
FIG. 12 depicts a cross-sectional perspective view of the second embodiment of the coaxial cable connector, illustrating the torque sleeve is selectively deposited in a fully engaged position relative to the post.

FIG. 8 shows an exploded perspective view of a coaxial cable connector according to an alternative exemplary embodiment of the present invention. FIG. 9 shows a perspective view of the coaxial cable connector. FIG. 10 shows a partially sectioned perspective view of the coaxial cable connector. FIG. 11 shows a cross-sectional perspective view of the coaxial cable connector, illustrating a torque sleeve is selectively deposited in a partially attached position relative to a post. FIG. 12 shows a cross-sectional perspective view of the coaxial cable connector, illustrating the torque sleeve is selectively deposited in a fully engaged position relative to the post. Referring to FIGS. 8 to 12, a second embodiment of the coaxial cable connector of the present invention is similar to the first embodiment, with the following main differences:

The head portion 21 of the post 2 defines an elastic collet 216 and has a rear end 217 opposite to the elastic collet 216. The inner diameter of the rear end 217 of the post 2 is smaller than the inner diameter of the elastic collet 216. The head portion 21 of the post 2 also has an outer groove 218 formed on the outer peripheral surface of the rear end 217. The elastic collet 216 has a surrounding wall 211 and a plurality of slots 212 formed in the surrounding wall 211 and all extend axially from an open end toward the rear end 217 of the post 2, so that the head portion 21 is formed a plurality of elastic pieces 219 circumferentially spaced apart from each other, thereby forming an elastic collet 216. Preferably, the inner diameter of the elastic collet 216 is tapered toward the first end 11 of the torque sleeve 1 in the axial direction. In some embodiments, the inner diameter can also be uniformly extended axially, as long as the elastic collet directly contact the external thread surface 711 of the external port 71, which can achieve the same purpose and effect of maintaining electrical continuity.

In some embodiments, the body portion 22 of the post 2 is tightly sleeved on the rear end 217 of the head portion 21. The post 2 further includes an annular element 27 and a rubber ring 28. The annular element 27 is tightly sleeved in the head portion 21, and the rubber ring 28 is sleeved between the annular element 27 and the head portion 21. The second sealing element 5 is disposed in the outer groove 218, and the opposite sides of the second sealing element 5 are in pressing contact with the head portion 21 of the post 2 and the end sleeve 3 respectively. In some embodiments, the annular element 27 and the body portion 22 or the annular element 27 and the head portion 21 can both be designed as an integral molding.

The end sleeve 3 is sleeved on the second end 12 of the torque sleeve 1. The end sleeve 3 includes a fixed portion 37 and a compression portion 38 arranged oppositely, and a stop portion 34 disposed between the fixed portion 37 and the compression portion 38. When the torque sleeve 1 is in the partially attached position relative to the post 2 (as shown in FIG. 11), the elastic collet 216 of the post 2 is in an uncompressed state. When the torque sleeve 1 is in the fully engaged position relative to the post 2 (as shown in FIG. 12), the elastic collet 216 of the post 2 is in a compressed state. The elastic collet 216 is compressed and radially deformed by the compression portion 38 of the end sleeve 3, so that the head post 21 of the post 2 is in close contact with the external thread surface of the external port of the electronic device.

To assemble the second embodiment of the coaxial cable connector of the present invention, for example, first, mount the head portion 21, the body portion 22 and the annular element 27 together, and then mount the second sealing element 5 on the head portion 21 of the outer groove 218. In the following step, the rubber ring 28 is sleeved between the annular element 27 and the elastic collet 216 defined by the head portion 21. Within the torque sleeve 1, the post 2, moved from the second end 12 of the torque sleeve 1 to the first end 11, is installed. Then the first engagement portion 35 of the end sleeve 3 is then inserted into the second engagement portion 14 of the second end 12 of the torque sleeve 1. The assembly is completed by installing the first sealing element 4 in the annular recess 16 of the torque sleeve 1.

Using the second embodiment of the coaxial cable connector of the present invention, the same effect and purpose can also be achieved as with the first embodiment of the coaxial cable connector. The elastic collet 216 of the post 2 is radially deformed by being pushed by the inner peripheral surface of the compression portion 38 of the end sleeve 3 as the torque sleeve 1 moves from the partially attached position to the fully engaged position. It provides a compressive force in a radial direction toward the axis, resulting in a tight fit between the post 2 and the threaded portion of the electronic device.

Figure 13:
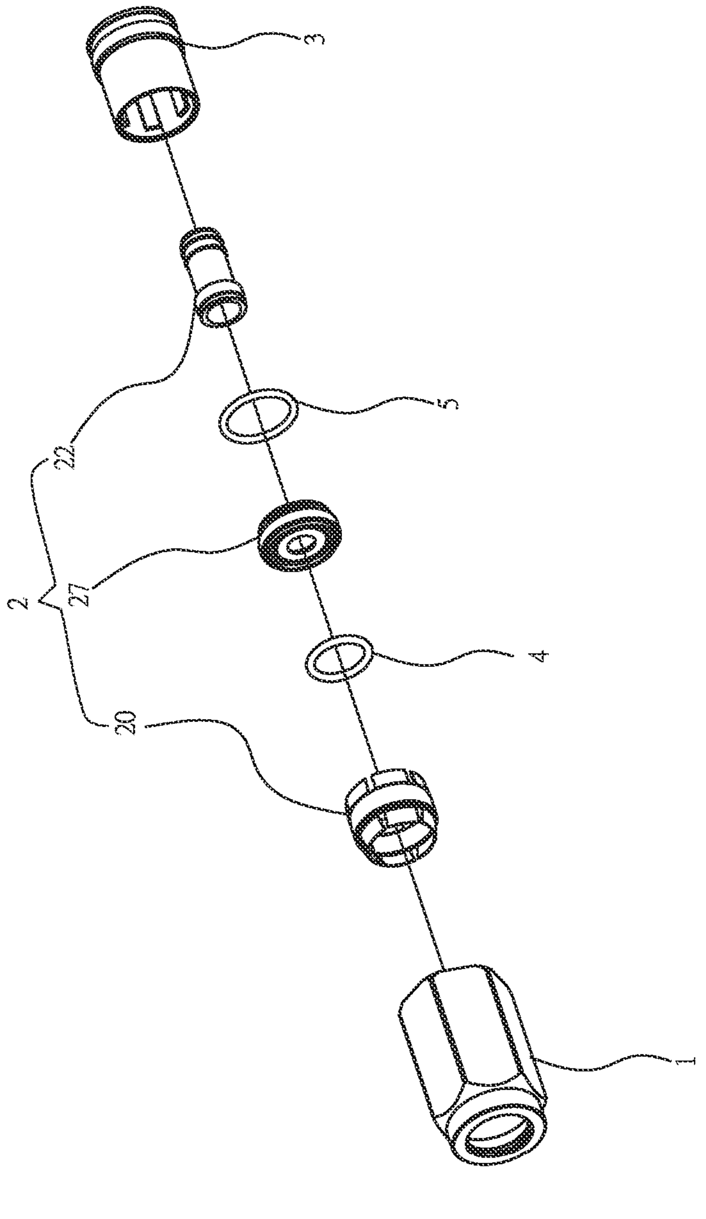
FIG. 13 depicts an exploded perspective view of a coaxial cable connector according to a third embodiment of the present invention.
Figure 14:
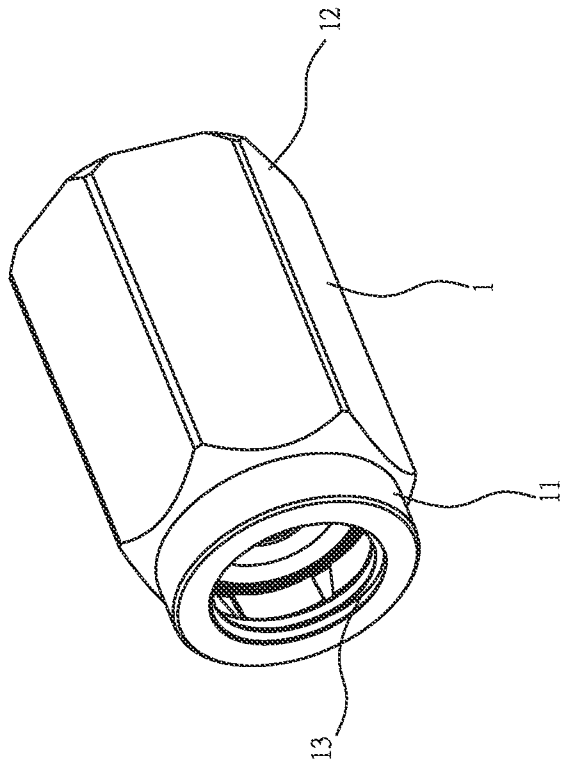
FIG. 14 depicts a perspective view of the third embodiment of the coaxial cable connector according to FIG. 13.
Figure 15:
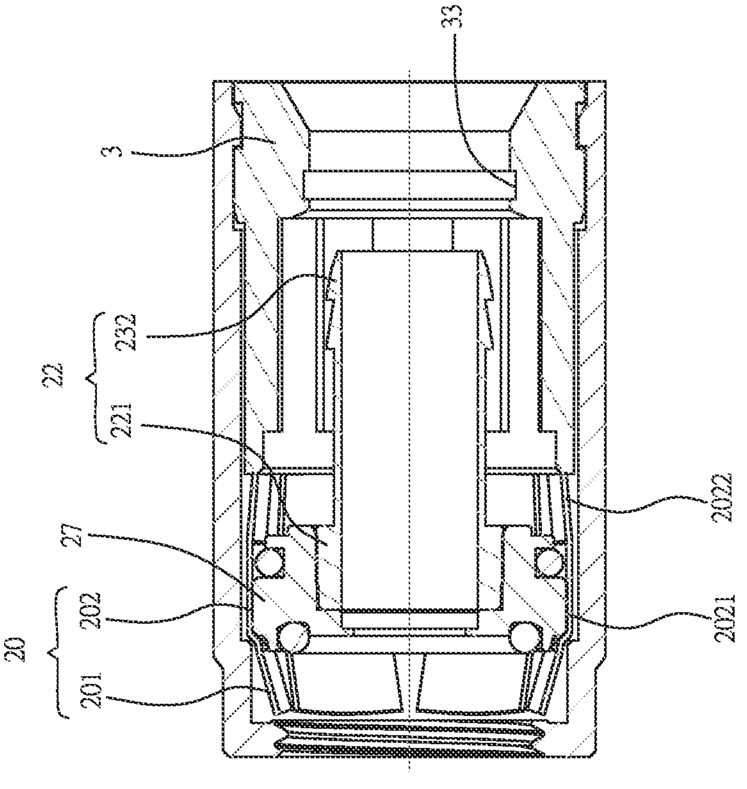
FIG. 15 depicts a cross-sectional perspective view of the third embodiment of the coaxial cable connector, illustrating a torque sleeve is selectively deposited in a partially attached position relative to the post.
Figure 16:
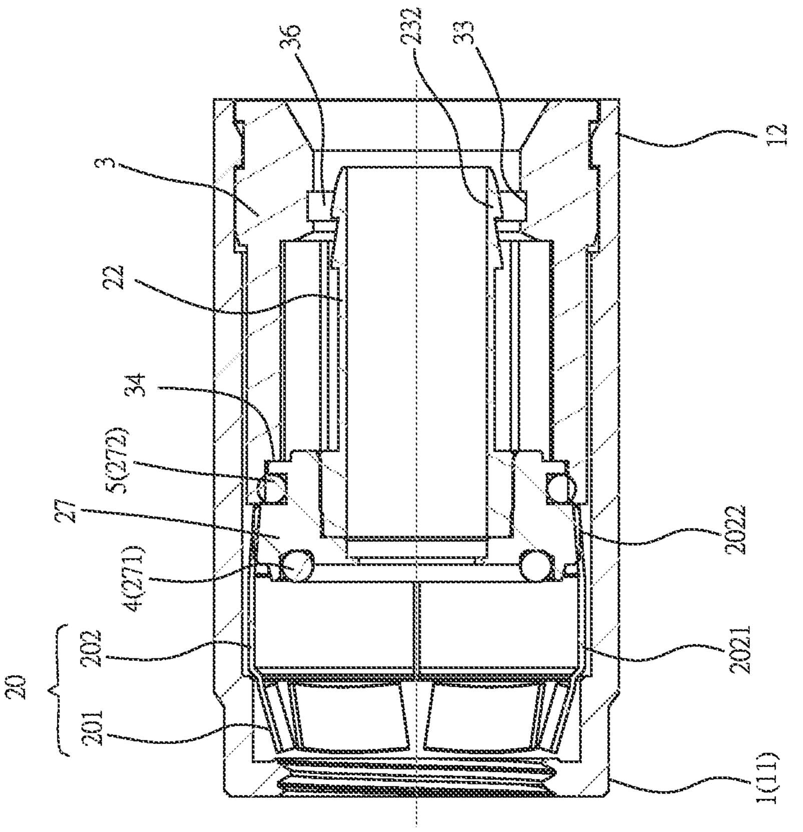
FIG. 16 depicts a cross-sectional perspective view of the third embodiment of the coaxial cable connector, illustrating a torque sleeve is selectively deposited in a fully engaged position relative to a post.

FIG. 13 shows an exploded perspective view of a coaxial cable connector according to a third embodiment of the present invention. FIG. 14 shows a perspective view of the third embodiment of the coaxial cable connector according to FIG. 13. FIG. 15 shows a cross-sectional perspective view of the third embodiment of the coaxial cable connector, illustrating a torque sleeve is selectively deposited in a partially attached position relative to the post. FIG. 16 shows a cross-sectional perspective view of the third embodiment of the coaxial cable connector, illustrating a torque sleeve is selectively deposited in a fully engaged position relative to a post. Referring to FIGS. 13 to 16, a third embodiment of the coaxial cable connector of the present invention is similar to the second embodiment, with the following main differences:

The post 2 includes a head portion 20, an annular element 27, and a body portion 22. The head portion 20 has a front end 201 and a tail end 202. The body portion 22 has a front segment 221 and a rear segment 232, and the front section 221 is arranged opposite the rear section 232. The annular element 27 is tightly fitted on the front segment 221 of the body portion 22, and both the annular element 27 and the body portion 22 are integrally and slidably mounted on the head portion 20. In this embodiment, the annular element 27 moves back and forth at the tail end 202 of the head portion 20. In other design applications, the annular element 27 can also move back and forth throughout the entire head portion 20, rather than being restricted to movement only at the tail end 202. In some embodiments, the annular element 27 and the body portion 22 are integrally formed and can be slidably disposed on the head portion 20.

To assemble the third embodiment of the coaxial cable connector of the present invention, for example, the annular element 27 and the body portion 22 can be first assembled together, and then the first sealing element 4 and the second sealing element 5 are respectively disposed in the inner groove 271 and the outer groove 272 of the annular element 27, and then placed in the head portion 20; then the above combination of semi-finished products is moved from the second end 12 of the torque sleeve 1 to the first end 11, and finally the end sleeve 3 is inserted into the second end 12 of the torque sleeve 1 to complete the assembly.

After assembly, in the third embodiment of the coaxial cable connector of the present invention, when the post 2 is subjected to external forces in the axial direction, the torque sleeve 1 can move relative to both the annular element 27 and the body portion 22 of the post 2 between a partially attached position (as shown in FIG. 15) and a fully engaged position (as shown in FIG. 16). In the partially attached position, the annular element 27 is located at the front half 2021 of the tail end 202 of the head portion 20, and the rear segment 232 of the body portion 22 of the post 2 and the inner groove 33 of the end sleeve 3 do not surround each other. In the fully engaged position, the annular element 27 of the post 2 is located at the rear half 2022 of the tail end 202 of the head portion 20 and abuts against the stop portion 34 of the end sleeve 3. The rear segment 232 of the body portion 22 of the post 2 and the inner groove 33 of the end sleeve 3 are surrounded by each other, that is, the rear segment 232 of the body portion 22 of the post 2 penetrates into the surrounding space 36 to reduce the surrounding space 36.

Figure 17:
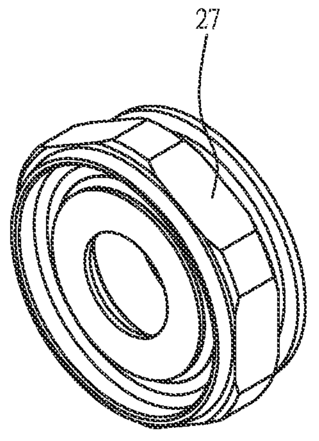
FIG. 17 depicts a perspective view of an annular element of a post of the coaxial cable connector according to various embodiments of the present invention.
Figure 18:
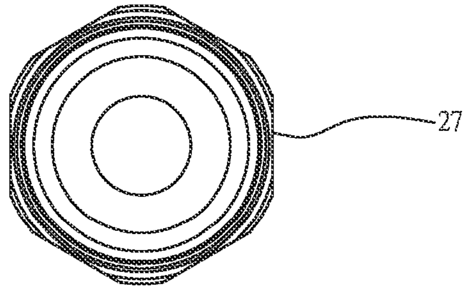
FIG. 18 depicts a front view of the annular element of the post of the coaxial cable connector according to FIG. 17.

In this embodiment, the appearance of the annular element 27 is circular (as shown in FIG. 13), it can also be a non-circular polygon, such as a hexagon (as shown in FIGS. 17 and 18), or one or more convex points formed on the outer peripheral surface of the annular element 27. An electrical conduction effect can be generated no matter what the shape of the annular element 27 as long as it contacts the elastic head portion 20 and can slide relatively.

Thus, the third embodiment can also achieve the same effect and purpose as the second embodiment.

Figure 19:
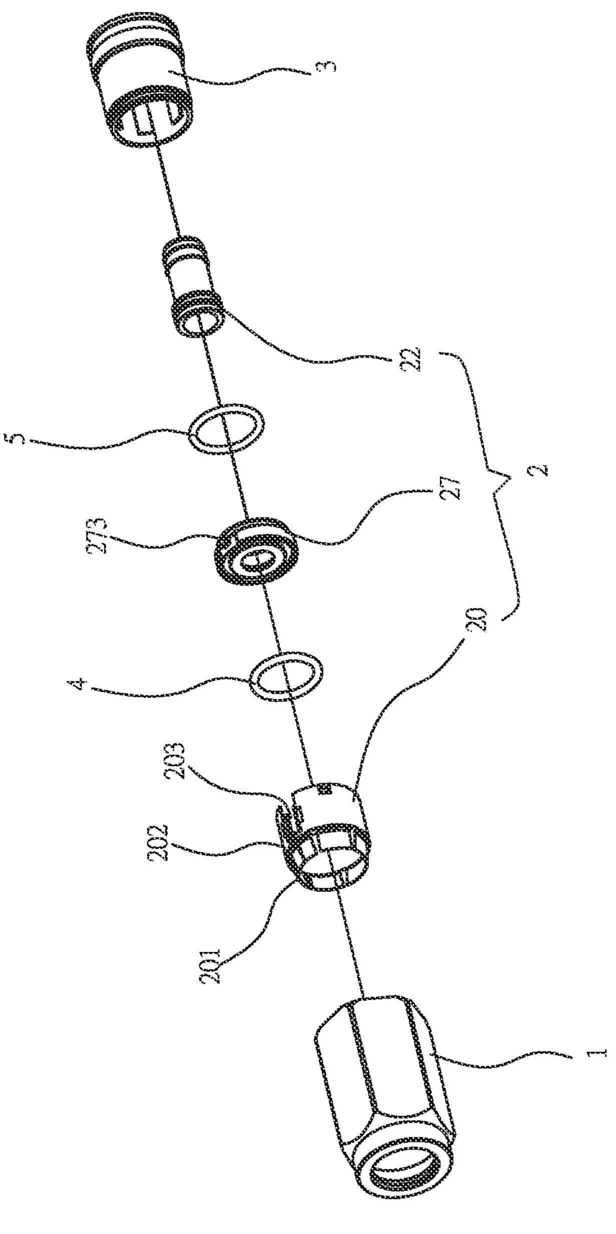
FIG. 19 depicts an exploded perspective view of a coaxial cable connector according to a fourth embodiment of the present invention.
Figure 20:
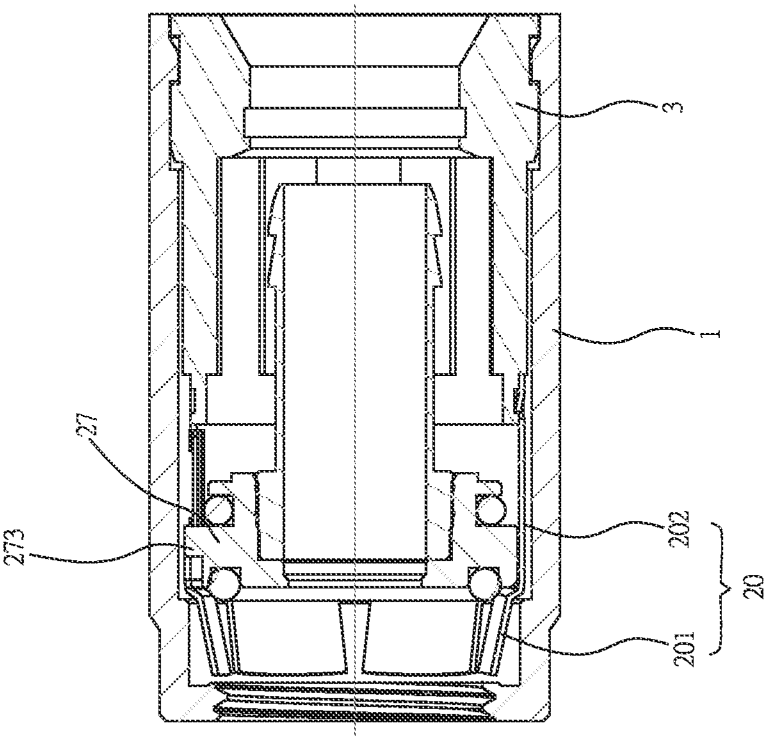
FIG. 20 depicts a cross-sectional perspective view of the fourth embodiment of the coaxial cable connector, illustrating a torque sleeve is selectively deposited in a partially attached position relative to the post.
Figure 21:
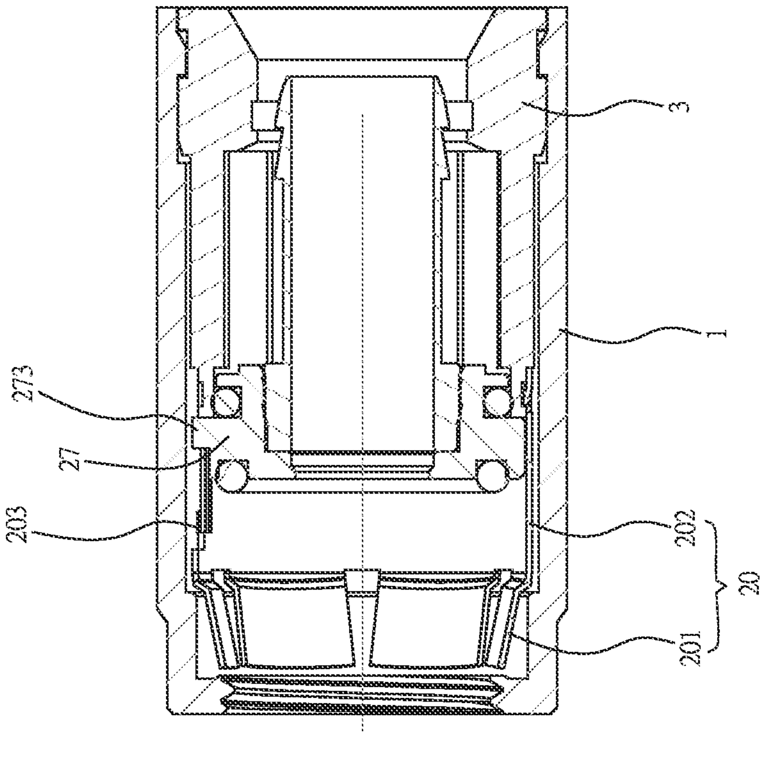
FIG. 21 depicts a cross-sectional perspective view of the fourth embodiment of the coaxial cable connector, illustrating a torque sleeve is selectively deposited in a fully engaged position relative to a post.

FIG. 19 shows an exploded perspective view of a coaxial cable connector according to a fourth embodiment of the present invention. FIG. 20 shows a cross-sectional perspective view of the fourth embodiment of the coaxial cable connector, illustrating a torque sleeve is selectively deposited in a partially attached position relative to the post. FIG. 21 shows a cross-sectional perspective view of the fourth embodiment of the coaxial cable connector, illustrating a torque sleeve is selectively deposited in a fully engaged position relative to a post. Referring to FIGS. 19 to 21, a fourth embodiment of the coaxial cable connector of the present invention is similar to the third embodiment, with the following main differences:

The head portion 20 of the post 2 has a front end 201, a tail end 202, and at least one first guiding portion 203 formed at the tail end 202. The annular element 27 of the post 2 has at least one second guiding portion 273, and the at least one second guiding portion 273 and the at least one first guiding portion 203 are shaped to be matched. For example, the at least one first guiding portion 203 is a groove, the at least one second guiding portion 273 is a convex block, and the at least one second guiding portion 273 of the annular element 27 is slidably disposed on the at least one first guiding portion 203 of the head portion 20. It is worth mentioning that the first guiding portion 203 is also available as convex block, while the second guiding portion 273 can be matched with groove. The quantity of the first guiding portion 203 and the second guiding portion 273 can also be multiple, without being limited to one.

Thus, the fourth embodiment can also achieve the same effect and purpose as the third embodiment.

Figure 22:
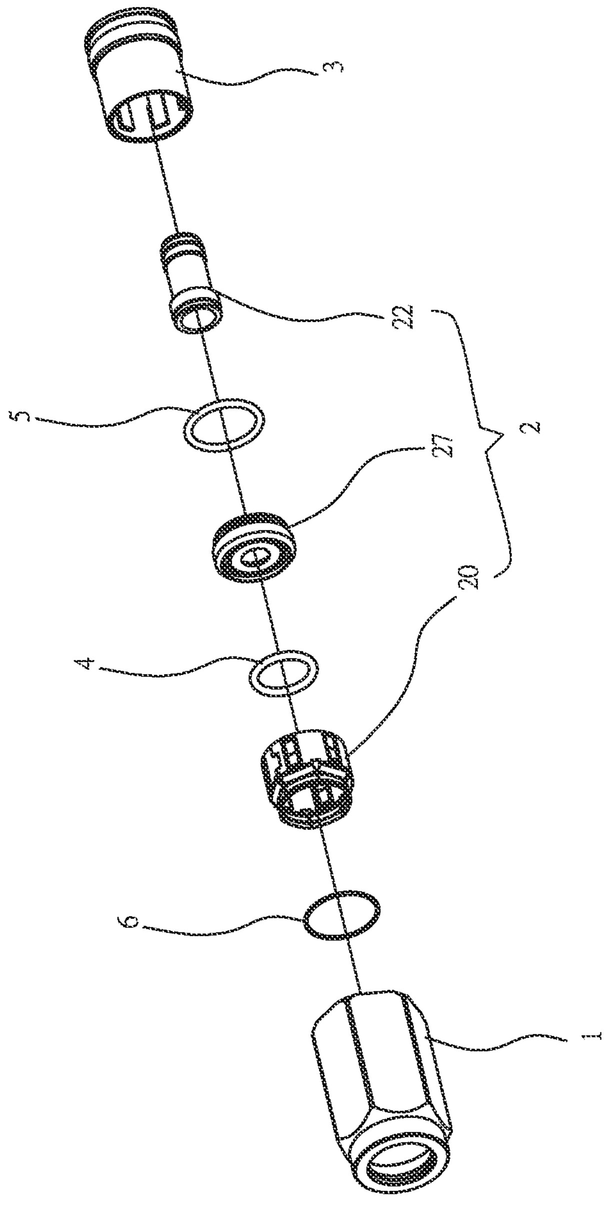
FIG. 22 depicts an exploded perspective view of a coaxial cable connector according to a fifth embodiment of the present invention.
Figure 23:
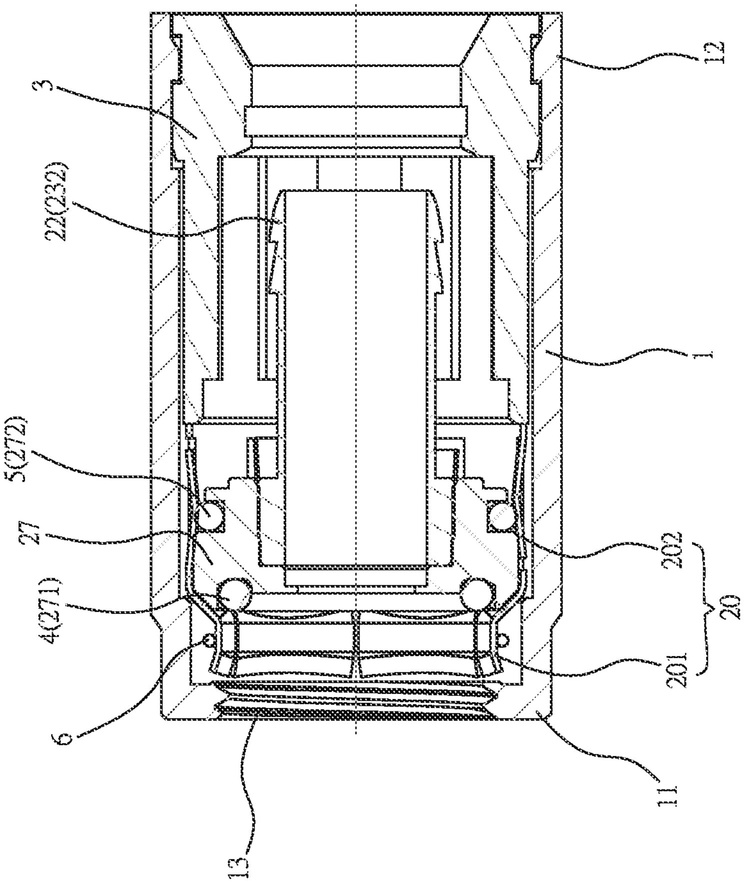
FIG. 23 depicts a cross-sectional perspective view of the fifth embodiment of the coaxial cable connector, illustrating a torque sleeve is selectively deposited in a partially attached position relative to the post.
Figure 24:
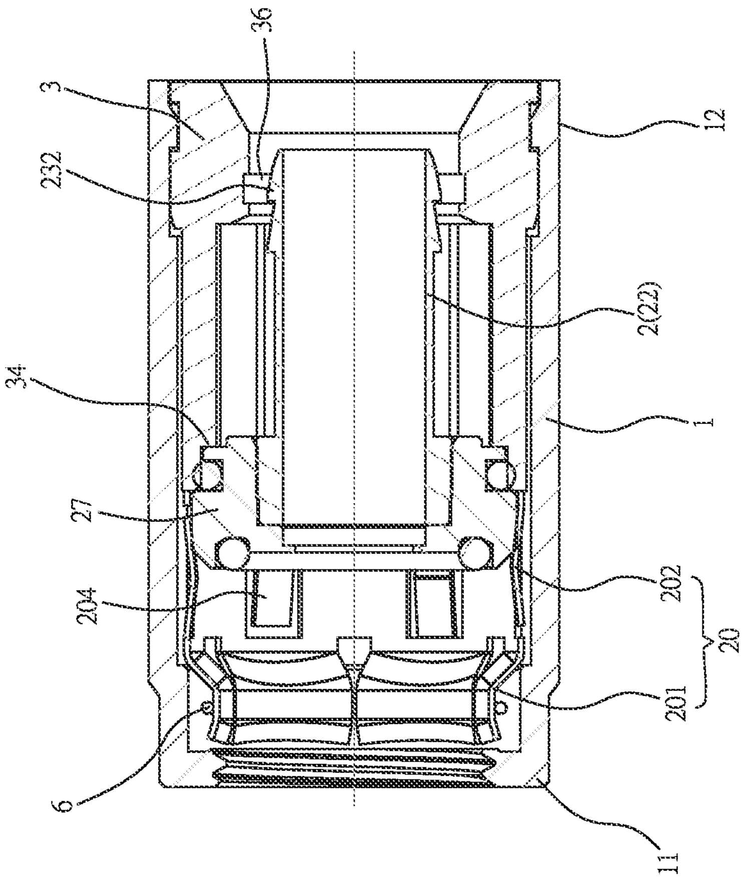
FIG. 24 depicts a cross-sectional perspective view of the fifth embodiment of the coaxial cable connector, illustrating a torque sleeve is selectively deposited in a fully engaged position relative to a post.
Figure 25:
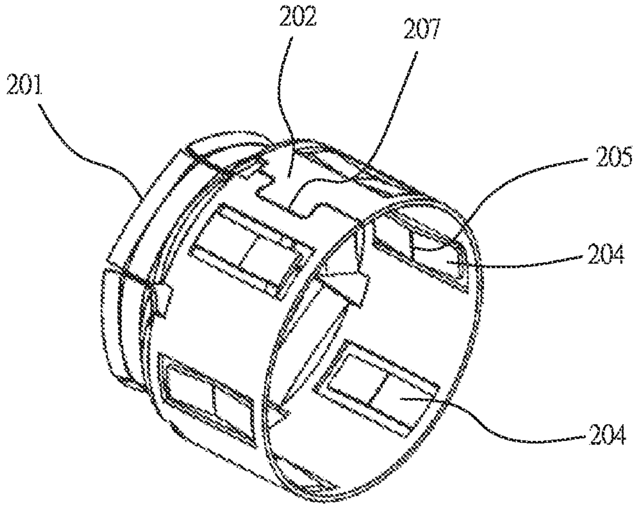
FIG. 25 depicts a perspective view of a head portion of a post of the fifth embodiment of the coaxial cable connector.
Figure 26:
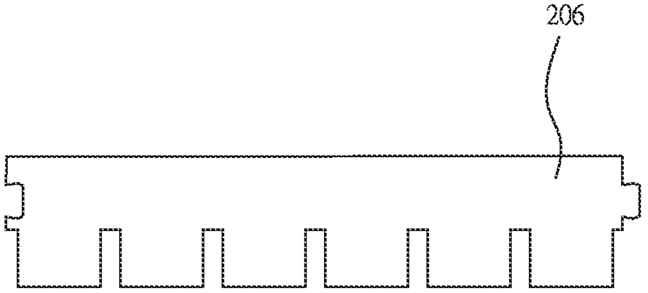
FIG. 26 depicts a schematic diagram of a sheet-like substrate of the fifth embodiment of the coaxial cable connector, illustrating the appearance of the head portion of the post before fabrication.

FIG. 22 shows an exploded perspective view of a coaxial cable connector according to a fifth embodiment of the present invention. FIG. 23 shows a cross-sectional perspective view of the fifth embodiment of the coaxial cable connector, illustrating a torque sleeve is selectively deposited in a partially attached position relative to the post. FIG. 24 shows a cross-sectional perspective view of the fifth embodiment of the coaxial cable connector, illustrating a torque sleeve is selectively deposited in a fully engaged position relative to a post. FIG. 25 shows a perspective view of a head portion of a post of the fifth embodiment of the coaxial cable connector. Referring to FIGS. 22 to 25, a fifth embodiment of the coaxial cable connector of the present invention is similar to the third embodiment, with the following main differences:

The head portion 20 of the post 2 has a front end 201, a tail end 202, and a plurality of elastic bending portions 204 formed at the tail end 202. In this embodiment, each elastic bending portion 204 has a protruding portion 205, and the outer surface facing the axis of the protruding portion 205 can be a pointed shape (as shown in FIG. 25) or other shapes such as a curved shape or a wavy shape. It is worth mentioning that there can only be elastic bending portion. For example, at the tail end of the head portion, an opening is provided, and an elastic bending portion is folded inward along its perimeter. Depending on the demand, multiple elastic bending portions can be folded inward at intervals along the periphery of the opening. In this embodiment, the head portion 20 of the post 2 is formed by joining together a sheet-like substrate 206 (as shown in FIG. 26), and the joint 207 is formed by connecting the opposite side edges of the sheet-like substrate 206 (as shown in FIG. 25).

To assemble the fifth embodiment of the coaxial cable connector of the present invention, for example, a ring 6 may first be fitted to the outer peripheral surface of the front end 201 of the head portion 20; then, the annular element 27 is combined with the body portion 22, and the first sealing element 4 and the second sealing element 5 are respectively mounted in the inner groove 271 and the outer groove 272 of the annular element 27, and then placed in the tail end 202 of the head portion 20; then the above combination of semi-finished products is moved from the second end 12 of the torque sleeve 1 to the first end 11, and finally the end sleeve 3 is inserted into the second end 12 of the torque sleeve 1 to complete the assembly.

The fifth embodiment of the assembled coaxial cable connector of the present invention can be installed on the external port 71 of the electronic device 7 (as shown in FIG. 5). The internal thread 13 of the torque sleeve 1 and the external thread surface 711 of the external port 71 are threaded together. Continuously rotate the torque sleeve 1 so that the internal thread 13 gradually moves relative to the external thread surface 711 of the electronic device 7 from the partially attached position (as shown in FIG. 23) to the fully engaged position (as shown in FIG. 24). As the torque sleeve 1 continuously rotates and advances, the front end 201 of the head portion 20 with the ring 6 installed is expanded. The external port 71 of the electronic device 7 contacts the head portion 20 of the post 2, and the annular element 27 also contacts the head portion 20, and the three generate electrical connection and have electrical conductivity effect. Then, as the torque sleeve 1 continues to rotate forward, the end surface 713 of the external port 71 abuts against the annular element 27 of the post 2, and pushes the annular element 27 towards the second end 12 of the torque sleeve 1, causing the annular element 27 of the post 2 to slide relative to the head portion 20 (the annular element 27 is continuously in contact with the elastic bending portion 204 of the head portion 20), until the annular element 27 of the post 2 abuts against the stop portion 34 of the end sleeve 3. Finally, the rear segment 232 of the body portion 22 of the post 2 penetrates into the surrounding space 36 defined by the end sleeve 3, thereby reducing the surrounding space 36 to compress the coaxial cable. Whether the third embodiment, fourth embodiment, or fifth embodiment, during the process of torque sleeve 1 gradually moving from the partially attached position to the fully engaged position, the external thread surface 711 of the external port of the electronic device 7, the head portion 20 of the post 2, and the annular element 27 continuously maintain contact, thereby continuously maintaining electrical conductivity.

Figure 27:
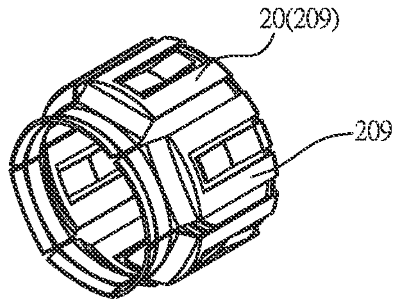
FIG. 27 depicts a perspective view of a head portion of a post of the coaxial cable connector according to various embodiments of the present invention.
Figure 28:
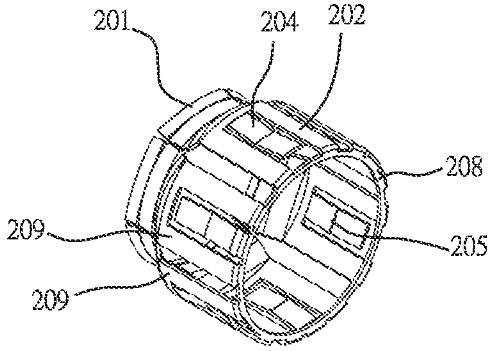
FIG. 28 depicts a perspective view of the head portion of the post of the coaxial cable connector as seen in another perspective.
Figure 29:
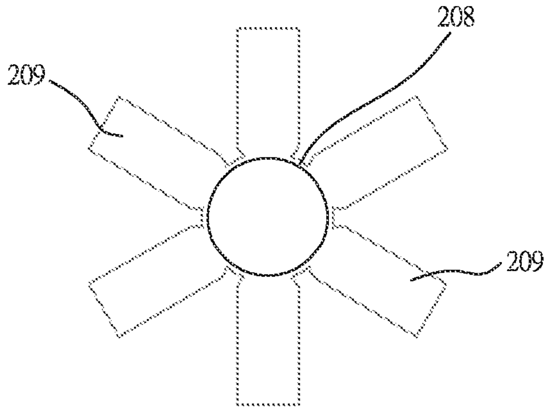
FIG. 29 depicts a schematic diagram of a head portion of a post of the fifth embodiment of the coaxial cable connector, illustrating the appearance of the head portion of the post before fabrication.

FIG. 27 shows a perspective view of a head portion of a post of the coaxial cable connector according to various embodiments of the present invention. FIG. 28 shows a perspective view of the head portion of the post of the coaxial cable connector as seen in another perspective. FIG. 29 shows a schematic diagram of a head portion of a post of the fifth embodiment of the coaxial cable connector, illustrating the appearance of the head portion of the post before fabrication. Referring to FIGS. 27 to 29, an alternative example of the head portion 20 of the post 2 of the coaxial cable connector of the present invention. The head portion 20 of the post 2 has a hollow base 208 and a plurality of elastic pieces 209 connected to the outer periphery of the hollow base 208. Each elastic piece 209 has a front end 201, a tail end 202 and at least one elastic bending portion 204 formed on the tail end 202, each elastic bending portion 204 has a protruding portion 205 toward the axis, the elastic pieces 209 are spaced apart from each other in the circumferential direction of the hollow base 208.

Thus, the fifth embodiment can also achieve the same effect and purpose as the third embodiment.

Figure 30:
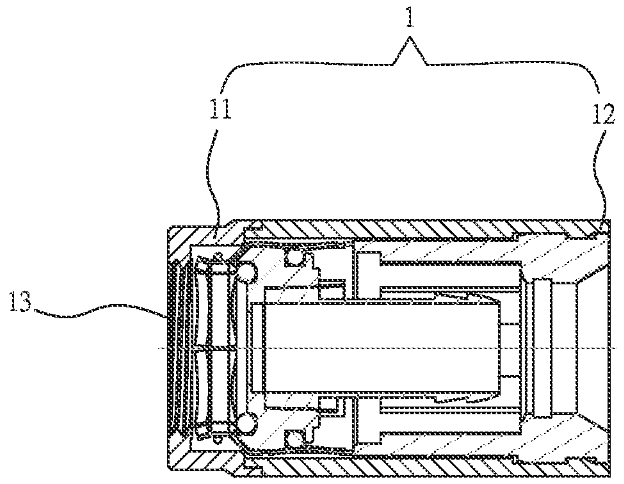
FIG. 30 depicts a cross-sectional perspective view of a torque sleeve of the coaxial cable connector of the present invention.
Figure 31:
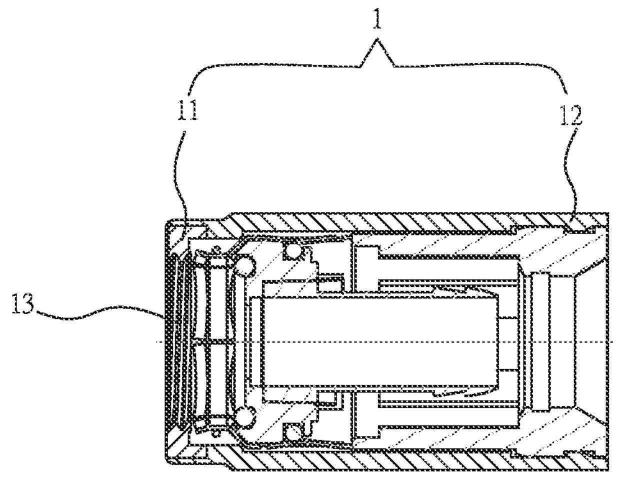
FIG. 31 depicts a cross-sectional perspective view of an alternative torque sleeve of the coaxial cable connector of the present invention.

In some embodiments, as the torque sleeve 1 is made of elastic or plastic material and is flexible, the internal thread 13 of the torque sleeve 1 and the external thread surface 711 of the external port 71 of the electronic device 7 are in closer contact with one another, the external port 71's thread of the electronic device 7 can be fitted tightly with the internal thread 13 of the torque sleeve 1, so that the gap between the two is close to zero or even zero, so as to prevent the torque sleeve 1 and the external thread surface 711 of the electronic device 7 from shaking. In some embodiments, the torque sleeve 1 is joined by dissimilar materials (as shown in FIG. 30 or FIG. 31), for example, with the first end 11 of the torque sleeve 1 having the internal thread 13 made of plastic or elastic material and the rest of the torque sleeve 1 made of metal, after the connection between the electronic device 7 and the torque sleeve 1 is established, the internal thread 13 of the torque sleeve 1 and the external thread surface 711 of the external port of the electronic device 7 are able to achieve the same purpose without a gap or even a very small gap.

In another embodiment, the internal thread 13 of the torque sleeve 1 can also have a geometric shape similar to a tooth shape or another non-thread shape, for example, sharp teeth, to fit the thread portion of the electronic device 7. In addition, the first end 11 and the second end 12 of the torque sleeve 1 may be combined by means of barbs, rivets, glue, welding, slots, aperture interference or other means.

In summary, the coaxial cable connector of the present invention is designed to electrically contact the external thread surface of the external port through the head portion of the post, so that the coaxial cable connector of the present invention can generate electrical conduction and has continuous electrical conduction effects during use. In addition, the coaxial cable connector of the present invention can prevent the coaxial cable from being separated without the use of special compression tools, thereby achieving the purpose of the present invention.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A coaxial cable connector, suitable for engaging with an external thread surface of an electronic device, the coaxial cable connector comprising:

a torque sleeve, including a first end and an internal thread formed on the first end, and a post, coaxially arranged in the torque sleeve, including a head portion and a body portion, wherein, when the coaxial cable connect is connected to the electronic device, the head portion is configured to electrically connect to the external thread surface of the electronic device, wherein, when the torque sleeve gradually moves from a first position to a second position relative to the external thread surface of the electronic device, one end of the external thread of the electronic device abuts the head portion of the post, allowing the post to move axially, and wherein the coaxial cable connector further comprises an end sleeve, the torque sleeve further includes a second end connected to the first end, the end sleeve is sleeved on the second end of the torque sleeve, the end sleeve includes a fixed portion and a compression portion oppositely arranged, and the head portion of the post defines an elastic collet, when the torque sleeve is in the first position, the elastic collet of the post is in a relaxed state, when the torque sleeve is in the second position, the elastic collet of the post is compressed and deformed by the compression portion of the end sleeve, thereby the head portion of the post in close contact with the external thread surface of the electronic device.

2. The coaxial cable connector of claim 1, wherein the torque sleeve further includes an annular torsion portion formed on an outer peripheral surface thereof for manual rotation of the torque sleeve.

3. The coaxial cable connector of claim 1, wherein the torque sleeve is made of plastic or elastic material and has flexibility.

4. The coaxial cable connector of claim 1, wherein the head portion of the post has a rear end opposite to the elastic collet, the body portion is tightly sleeved on the rear end of the head portion, and the post further includes an annular element tightly sleeved inside the head portion, and a rubber ring sleeved between the annular element and the head portion.

5. The coaxial cable connector of claim 4, wherein the head portion of the post further has an outer groove formed on the outer peripheral surface of the rear end, the coaxial cable connector further comprises a sealing element located in the outer groove, and opposite sides of the sealing element are in pressing contact with the head of the post and the end sleeve.

6. The coaxial cable connector of claim 1, wherein the head portion of the post is detachably connected to the body portion.

7. The coaxial cable connector of claim 6, wherein the torque sleeve further includes an opening, and an annular recess between the opening and the internal thread, the annular recess is used for accommodating a first sealing element.

8. The coaxial cable connector of claim 7, wherein the large diameter shaft portion of the post has a first plane, the connecting portion has a second plane, and the first plane cooperates with the second plane to define a notch for accommodating the second sealing element, the opposite sides of the second sealing element are in pressing contact with the second plane of the post and the torque sleeve respectively.

9. The coaxial cable connector of claim 6, wherein the head portion of the post is an electrical conductor, when the coaxial cable connector is not completely installed on the external thread surface of the electronic device, the head portion of the post and the external thread surface of the electronic device are in contact and electrically connected.

10. The coaxial cable connector of claim 6, wherein the torque sleeve further includes an annular torsion portion formed on the outer peripheral surface, which enables the user to rotate the torque sleeve rotating relative to the external thread surface by applying force.

11. The coaxial cable connector of claim 6, wherein the body portion of the post has a small diameter shaft portion, a large diameter shaft portion, and a connecting portion connecting the small diameter shaft portion and the large diameter shaft portion, wherein the connecting portion and the large diameter shaft portion cooperate to define an accommodating space, and the head portion of the post is arranged in the accommodating space.

12. The coaxial cable connector of claim 11, wherein the end of the large diameter shaft portion of the post opposite to the connecting portion has a protrusion, and the protrusion is used to prevent the head portion of the post from moving away from the connecting portion, wherein the protrusion, the large diameter shaft portion and the connecting portion cooperate to define the accommodating space.

13. The coaxial cable connector of claim 11, wherein the head portion of the post has a surrounding wall, and a plurality of slots formed in the surrounding wall.

14. The coaxial cable connector of claim 11, wherein the head portion of the post has a surrounding wall, and a slot formed in the surrounding wall, the slot communicates opposite side edges of the surrounding wall, so that the head portion of the post is in the shape of a C.

15. The coaxial cable connector of claim 14, wherein the head portion of the post further has a plurality of hollows extending axially, the hollows are formed in the surrounding wall and are closed without communicating with either side of the surrounding wall.

16. The coaxial cable connector of claim 15, wherein the surrounding wall of the post has opposite side edges, and an arcuated portion connecting the side edges, in a free state, the minimum inner diameter of the arcuated portion is smaller than the outer diameter of the thread portion of the electronic device.

17. The coaxial cable connector of claim 11, further comprising an end sleeve, the torque sleeve further includes a second end connected to the first end, the end sleeve is sleeved on the second end of the torque sleeve, the end sleeve includes a stop portion extending toward the first end of the torque sleeve, when the torque sleeve is in the second position, the body portion of the post abuts against the stop portion of the end sleeve.

18. The coaxial cable connector of claim 11, further comprising an end sleeve, the torque sleeve further includes a second end opposite to the first end, the body portion of the post further has a rear segment connected to the small diameter shaft portion, the end sleeve is coaxially arranged inside the second end of the torque sleeve, when the torque sleeve is in the first position, the rear segment of the post and the end sleeve cooperate to define a first distance in the radial direction, and when the torque sleeve is in the second position, the rear segment of the post and the end sleeve cooperate to define a second distance in the radial direction, and the second distance is smaller than the first distance.

19. The coaxial cable connector of claim 18, wherein the inner surface of the end sleeve has an inner groove, the inner surface of the end sleeve is stepped, the end sleeve includes a first annular surface and a second annular surface, the inner diameter of the first annular surface is larger than the inner diameter of the second annular surface, and the inner groove is formed on the second annular surface.

20. A coaxial cable connector, suitable for engaging with an external thread surface of an electronic device, the coaxial cable connector comprising:

a torque sleeve, including a first end and an internal thread formed on the first end; and a post, coaxially arranged in the torque sleeve, including a head portion and a body portion, wherein, when the coaxial cable connector is connected to the electronic device, the head portion is configured to electrically connect to the external thread surface of the electronic device, wherein, when the torque sleeve gradually moves from a first position to a second position relative to the external thread surface of the electronic device, one end of the external thread of the electronic device abuts the head portion of the post, allowing the post to move axially;

wherein the head portion of the post is detachably connected to the body portion:

wherein the body portion of the post has a small diameter shaft portion, a large diameter shaft portion, and a connecting portion connecting the small diameter shaft portion and the large diameter shaft portion, wherein the connecting portion and the large diameter shaft portion cooperate to define an accommodating space, and the head portion of the post is arranged in the accommodating space; and wherein the coaxial cable connector further comprises an end sleeve, the torque sleeve further includes a second end opposite to the first end, the body portion of the post further has a rear segment connected to the small diameter shaft portion, the end sleeve is coaxially arranged inside the second end of the torque sleeve, when the torque sleeve is in the first position, the rear segment of the post and the end sleeve cooperate to define a first distance in the radial direction, and when the torque sleeve is in the second position, the rear segment of the post and the end sleeve cooperate to define a second distance in the radial direction, and the second distance is smaller than the first distance.

21. A coaxial cable connector, suitable for engaging with an external thread surface of an electronic device, the coaxial cable connector comprising:

a torque sleeve, including a first end and an internal thread formed on the first end; and a post, coaxially arranged in the torque sleeve, including a head portion and a body portion, wherein, when the coaxial cable connector is connected to the electronic device, the head portion is used to electrically connect to the external thread surface of the electronic device, wherein, when the torque sleeve gradually moves from a first position to a second position relative to the external thread surface of the electronic device, one end of the external thread of the electronic device abuts the head portion of the post, allowing the post to move axially, wherein the head portion of the post is detachably connected to the body portion;

wherein the body portion of the post has a small diameter shaft portion, a large diameter shaft portion, and a connecting portion connecting the small diameter shaft portion and the large diameter shaft portion, wherein the connecting portion and the large diameter shaft portion cooperate to define an accommodating space, and the head portion of the post is arranged in the accommodating space; and wherein the coaxial cable connector further comprises an end sleeve, the torque sleeve further includes a second end connected to the first end, the end sleeve is sleeved on the second end of the torque sleeve, the end sleeve includes a stop portion extending toward the first end of the torque sleeve, when the torque sleeve is in the second position, the body portion of the post abuts against the stop portion of the end sleeve.

* * * * *